United States Patent Office 2,772,982
Patented Dec. 4, 1956

2,772,982

PIGMENTED WAXES AND METHOD OF PREPARING SAME

Vincent C. Vesce, Smoke Rise, Kinnelon, N. J., assignor to The B. F. Goodrich Company, New York, N. Y., a corporation of New York No Drawing. Application June 2, 1953,
Serial No. 359,223

The portion of the term of the patent subsequent to August 18, 1970, has been disclaimed and dedicated to the Public 16 Claims. (Cl. 106—272)

This invention relates to pigmented compositions and more particularly relates to the production of pigmented compositions of matter suitable for the coloring of plastics generally and specifically in the present application to the pigmentation of one of the classes of plastics, namely, waxes, disclosed in my prior application Serial No. 108,423, filed August 3, 1949, United States Patent No. 2,649,382, issued August 18, 1953, of which this present application is a continuation-in-part.

The production of plastic masses containing dispersed pigment for incorporation into large batches for coloring purposes is not broadly new. Such dispersions are known in the industry as "color master batches." In the production of wax color master batches heretofore it has been necessary to submit pigment and wax to prolonged and expensive mechanical working in equipment capable of exerting high shearing stresses in order to achieve a dispersion of pigment in wax of moderately satisfactory quality. In such prior operations, the milling times are considerable, the power requirements for such equipment very high, the constant attendance of skilled labor is required, and the degree of dispersion obtained leaves much to be desired when a very fine degree of dispersion is required.

I have discovered that wax color master batches of extremely high quality can be prepared in an efficient manner with simple inexpensive milling of pigment and wax by the use of a novel and special type of liquid grinding medium, which later can be easily removed from the milled batch, and even reused, if desired, for new batches. After the removal of the liquid grinding medium from the milled batch, the dispersed pigment-in-wax is dried, the dried wax master color batch being normally in a free-flowing particulate form, which is soft in texture.

The wax master color batches produced in the novel process above recited are stable, uniform and free from agglomerates, have a high chromaticity, and, when used to color other masses, make available the full strength of the pigment employed.

Further objects of this invention will be apparent from the detailed specifications which follow.

In practicing the invention of this application, I place in a ball, pebble or other colloidal mill a mixture consisting essentially of the wax to be pigmented, the specific pigment, and the novel liquid grinding medium comprising water and a liquid organic solvent for the wax to be pigmented characterized additionally by its water-miscibility. Preferably, both the wax and the pigment are in particulate form. The organic solvent and water are present in the novel liquid grinding medium in such proportions that the liquid grinding medium does not dissolve a substantial amount of the wax and does not cause substantial agglomeration of the wax. The balls or pebbles or other solid grinding elements are added to the mixture of wax, pigment and liquid grinding medium, the mill closed and allowed to grind the mixture, without necessity for any attendant, until a dispersion of pigment in wax of the desired degree is obtained.

The waxes which are embodied in the specification as illustrative of the invention of this application are waxes of normally solid structure, substantially insoluble in water and at least partially soluble in an organic solvent which is miscible with water. Such a wax is hereinafter in this specification and in the appended claims termed a "solid organic wax." Many solid organic waxes, but by no means all such waxes, are enumerated and classified in volume 5, chapter 1, of "Protective And Decorative Coatings," edited by Joseph J. Mattiello, Ph. D., and published in 1946 by John Wiley & Sons, Inc., of New York.

On page 5 et seq. and on page 81 et seq. of the above-identified Mattiello publication, there are enumerated some of the solid organic waxes, but by no means all such waxes, which come within that term as in this application employed, which includes both natural waxes and synthetic waxes. The common solid organic waxes of natural origin are beeswax, Chinese wax, candelilla wax, carnauba wax, Japan wax, montan wax, ozocerite wax, ceresin wax, paraffin wax, spermaceti wax, etc. The synthetic solid organic waxes are commercially available in great numbers. They include the high molecular weight fatty acids and alcohols, and admixtures thereof, occurring in natural waxes, such as lauric acid, palmitic acid, cerotic acid, montanic acid, melissic acid, cetyl alcohol, octadecyl alcohol, ceryl alcohol, melissyl alcohol, pentacosane, hentriacontane, and higher molecular weight paraffins of the generic formula $C_nH_{2n+2}$, such as ozocerite, ceresin, paraffin, etc. They also include the solid organic acids, such as stearic acid and the soaps of the fatty acids, such as Opalwax; and also halogenated aromatic compounds, of which chlorinated diphenyls (Arochlor) and chlorinated naphthalenes (Halowax) are illustrative. The solid organic waxes hereinabove listed are not limitative of the solid organic waxes suitable for the purposes of this invention, but are here given by way of examples only.

As pigment, one may employ any of the solid colorants normally used in the industry for the coloring, opacifying, delustering or otherwise modifying the color of waxes. These include the inorganic prime pigments, organic prime pigments, various inert or extender pigments, metallic pigments and the various finely divided carbon blacks, including bone and gas blacks, such as disclosed in Mattiello's "Protective and Decorative Coatings," volume 2, chapter 1 (1942), or the Journal of the Society of Dyers and Colorists, volume 61 (307), December 1945.

As an essential feature of the invention, the solid organic wax and pigment are mixed with a liquid grinding medium comprising water and a liquid organic water-miscible solvent for the wax employed. It is important that the mixture of water and solvent be present in such proportions in the liquid grinding medium that, during the time of processing, the mixture of liquid organic solvent and water does not substantially dissolve the solid organic wax or substantially cause it to gel or agglomerate.

To accurately find the point at which the liquid organic solvent and water liquid grinding medium becomes substantially a non-solvent for the solid organic wax, a series of test specimens are made up comprising the selected solvent with various percentages of water. Such solutions may vary in 5% or 10% increments depending upon the precision desired. Thus, as an example, one may fill a number of bottles with water-solvent solutions varying from 10% to 90% water by weight by increments of 5% or 10%. A small amount of the solid organic wax is then added to each bottle, preferably in the physical form in which it is to be used and in an amount of about 1 part of solid organic wax to 4 parts of liquid medium. The mixture is well agitated and the solid organic wax is then permitted to settle.

One may note that in one or more of the bottles the solid organic wax either goes completely into solution or clumps or agglomerates into a more or less translucent, gel-like mass. It will also be noted that in the remaining bottles, the wax retains a discrete particle appearance. While these effects can generally be observed almost immediately, it is better to permit about 4 hours of contact before comparisons are made and still more preferably one may allow as much time for contact as is to be given during the actual pigment dispersion operation.

The action of the mixture of water and liquid organic solvent on the solid organic wax when it is less drastic than that which causes a gelling and agglomeration of the solid organic wax and yet contains sufficient solvent to make the solid organic wax receptive to pigment dispersion can best be termed a "pigment receptive action" on the wax.

The most desirable and optimum water-organic solvent liquid grinding medium has been found to be the one having that proportion of water just sufficient to prevent the above-mentioned extensive solvent action, and yet have enough solvent present to attack the solid organic wax and make it receptive to the entrance and dispersion of pigment. It should be clearly understood, however, that for operability there is no precise percentage of solvent in water or precise point where the liquid medium imparts the receptive quality to the solid organic wax but, rather, a range which may vary from about 2 or 3 percent—in the case of particular solvents and particular solid organic waxes—to as much as about 90% with other solvents and solid organic waxes. The indication that the amount of solvent is "approximately" below that which results in gelling or agglomeration is intended to cover that range where the pigment receptive action on the solid organic wax takes place.

The amount of liquid grinding medium comprising liquid organic solvent and water, used in the process, is selected by the operator to be sufficient to give fluidity to the solids in the particular mill used in the process. A mill with flint pebbles, for example, will generally require more liquid grinding medium than one using steel balls. It is, of course, obvious that one may, if so desired, use other types of mills for the grinding operation.

Such liquid organic water-miscible solvents which will solubilize the solid organic waxes include the alcohols, as, for example, methyl, ethyl, iso-propyl alcohol, diacetone alcohol, etc.; dioxane; the glycol ethers as, for example, the Cellosolves and the Carbitols; the esters such as the Cellosolve acetates and methyl or ethyl lactate; the ketones such as acetone, methyl-ethyl ketone; and other solvents or mixture of solvents for the solid organic waxes well-known to the art.

For a better understanding of the invention, the following examples are given, it being clearly understood that these are merely by way of illustration and not to be considered limitative of the invention. Reference to the pigments employed utilize the generally accepted trade name. The letter "M" with figure and page number following the name refers to the figures and pages in volume 5 of J. J. Mattiello's "Protective and Decorative Coatings" which gives the chemical composition. The designation "C. I." refers to the well-known Colour Index published by the Society of Dyers & Colourists.

Unless otherwise noted, all percentages are to be considered as being on a weight basis.

Example 1

A one-gallon porcelain pebble mill is charged with 150 grams of Pyrazolone Red Toner (M: Fig. 71, page 402) and 1100 grams of a liquid grinding medium comprising 733 grams of water and 360 grams of acetone (33.3% solvent). This is well mixed and to the mixture is then added 300 grams of powdered paraffin. About 7 lbs. of #00 French flint pebbles are added and milling is carried out for approximately 45 hours. The mill is then discharged and rinsed out with water. The product and wash liquid are collected and filtered. The filter cake is finally washed, dried and pulverized. One obtains about 435 grams of a bright red powder paraffin product which is excellently suited for the manufacture of colored candles.

Example 2

A one-gallon porcelain pebble mill is charged with 100 grams of Dianisidine Blue Toner (M: Fig. 43, page 388) and 1600 grams of a liquid grinding medium consisting of 50% denatured ethanol and 50% water. This is mixed well and to the mixture is added 200 grams of Stearic Acid Triple Pressed Pearls. About 7 lbs. of #00 French flint pebbles are added. After milling for about 45 hours, the mill is discharged and rinsed out with water. After filtration and washing the filter cake is dried at 120° F., which is below the melting point of stearic acid, and the dried product is then pulverized. One obtains 294 grams of deep blue lumps which may be comminuted and screened to any desirable size, thus forming a non-dusting particle which disperses readily into rubber.

In another operation, Fanchon Maroon Toner (M: Fig. 105, page 419) is substituted as a pigment. The resulting product comprises deep maroon lumps easily comminuted to form granules of a non-dusting color base suitable for melting into appropriate lipstick base to form a good dispersion possessing great tinctorial power.

Example 3

A one-gallon porcelain pebble mill is charged with 150 grams of Rhodamine B Benzoated Lake (M: Fig. 40, page 387) and 1600 grams of a liquid grinding medium consisting of 30% denatured ethanol and 70% water by weight. This is mixed well and to the mixture is added 150 grams of cetyl alcohol fine shavings. About 7 lbs. of #00 French flint pebbles are added. After milling for about 45 hours, the mill is discharged and rinsed out with water. The product and wash liquid are collected, filtered, washed and dried at 120° F. after which the filter cake is pulverized to produce fine non-dusting granules used for the coloring of lipstick base. The filtrate was recovered and used as the liquid grinding medium for another batch of a similar product.

Example 4

A one-gallon porcelain pebble mill is charged with 250 grams of Phthalocyanine Green (M: Fig. 144, page 439) and 1500 grams of a liquid grinding medium comprising 450 grams of acetone and 1050 grams of water, resulting in a liquid medium consisting of about 30% acetone and 70% water by weight. This is well mixed and to the mixture is then added 250 grams of chlorinated diphenyl, such as is marketed under the trade name Arochlor #5460. About 7 lbs. of #00 French flint pebbles are added and milling is carried out for approximately 40 hours. The mill is then discharged and rinsed out with water. The product and wash liquid are collected and filtered. The filter cake is washed, dried and pulverized. One obtains about 485 grams of a bright green powdered wax product.

As indicated hereinbefore, the amount of liquid grinding medium employed in the process is selected to provide a consistency suitable for optimum milling operation. As can be seen, wide variations in the amount of liquid used is possible, depending upon the amount of solids to be milled, the type of milling employed and the types of solid organic waxes and pigment to be blended into a wax color master batch.

The amount of pigment used in the process, and therefore present in the final wax color master batch, may vary from as little as about 1% to as high as approximately 95% by weight, depending on the end use. For most purposes as a solid organic wax color master batch, a range of approximately 30% to 70% pigment by weight to the total weight of the color master batch is preferred.

It is in some cases advantageous to use additional materials in the milling operation to overcome certain difficulties inherent in the solids being milled, whether in the solid organic wax or in the pigment. Thus, where the solids are acid or alkaline to such extent that the acidity or alkalinity might adversely affect the quality of the final product, or might seriously corrode the milling equipment, one may overcome this difficulty by adding suitable buffering or neutralizing agents which are water soluble and thus capable of being easily removed during the washing operations.

It is here pointed out that one may by the process of this invention make pigmented solid organic wax color batches with a mixture of pigments, in lieu of the single pigment of the above examples, and/or with a mixture of solid organic waxes rather than a single solid organic wax, in order to obtain desired properties in the pigmented solid organic wax color master batch not obtainable with a single pigment and/or with a single solid organic wax.

The terms "color value" and "chromaticity" as used hereinabove and in the claims, are terms well known in the art and are employed substantially as described and discussed in "Handbook of Colorimetry" by A. C. Hardy, published by the Technology Press.

What is claimed is:

1. A process for dispersing pigment in a solid organic wax which comprises milling pigment and solid organic wax in a liquid grinding medium comprising water and a liquid organic water-miscible solvent in which the solid organic wax is at least partially soluble, the water and solvent being present throughout the milling operation in such proportions that the liquid grinding medium does not dissolve a substantial amount of the solid organic wax and does not cause a substantial agglomeration of the solid organic wax, the liquid grinding medium being present at all times in such amounts as to give a fluidity to the mixture which permits effective milling action, continuing the milling action until a dispersion of pigment in solid organic wax is obtained, and thereafter separating the solid portion from the liquid portion of the milled mixture.

2. The process of claim 1 wherein the pigment and the solid organic wax are each admixed with the liquid grinding medium in particulate form, wherein the solid organic wax particles are cuased to become pigment-receptive by action of the liquid grinding medium thereon and wherein the milling action produces impinging contact of particles with pigment-receptive solid organic wax particles.

3. The process of claim 1 wherein the solid organic wax is selected from a class consisting of beeswax, Chinese wax, candelilla wax, carnauba wax, Japan wax, montan wax, ozocerite wax, ceresin wax, paraffin wax, spermaceti wax, high molecular weight fatty acids and halogenated aromatic compounds, chlorinated diphenyls and chlorinated naphthalenes.

4. A solid organic wax color master batch produced by the process of claim 1 wherein the amount of pigment is within a range of 30% to 70% of the total weight of the color master batch.

5. A solid organic wax color master batch produced by the process of claim 1 consisting essentially of pigmented solid organic wax in the form of free-flowing particles, said particles being readily dispersible in a solid or liquid miscible with the wax to yield a uniform dispersion of pigment in the extended wax base.

6. A solid organic wax color master batch consisting essentially of pigmented solid organic wax in the form of free-flowing particles possessing a chromaticity not substantially less than the pigment portion thereof.

7. A solid lipstick color master batch comprising a solid organic wax into which a pigment has been dispersed by the process of claim 1.

8. The solid lipstick color master batch of claim 7 wherein the wax is selected from a class consisting of cetyl alcohol and stearic acid.

9. The solid lipstick color master batch of claim 7 wherein the wax is cetyl alcohol.

10. A method of producing a solid organic wax color master batch which comprises milling pigment and solid organic wax in a liquid grinding medium comprising water and a liquid organic water-miscible solvent, the water and solvent being present in such proportions that the liquid grinding medium does not dissolve a substantial amount of the solid organic wax, the liquid grinding medium being present in such amounts as to give a fluidity to the mixture which permits effective milling action, continuing the milling action until a dispersion of pigment in solid organic wax is obtained, separating the solid portion from the liquid portion of the milled mixture, and then washing, drying and pulverizing the said solid portion to produce a pigmented solid organic wax color master batch.

11. The process of claim 10 wherein the pigment and the solid organic wax are each in particulate form at the beginning of the milling operation.

12. The process of claim 10 wherein the pigment and the solid organic wax are each in particulate form at the start of the milling operation and wherein the wax retains its particulate form throughout the operation.

13. The process of claim 10 wherein the solid organic wax is cetyl alcohol.

14. The process of claim 10 wherein the solid organic wax is stearic acid.

15. The process of claim 10 wherein the solid organic was is paraffin.

16. The process of claim 10 wherein the solid organic wax is chlorinated diphenyl.

References Cited in the file of this patent
UNITED STATES PATENTS

| | | |
|---|---|---|
| 2,266,638 | Hauser | Dec. 16, 1941 |
| 2,649,382 | Vesce | Aug. 18, 1953 |